US 6,903,559 B2

(12) United States Patent
Gayman

(10) Patent No.: US 6,903,559 B2
(45) Date of Patent: Jun. 7, 2005

(54) METHOD AND APPARATUS TO DETERMINE INTEGRATED CIRCUIT TEMPERATURE

(75) Inventor: Jason A. Gayman, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 3 days.

(21) Appl. No.: 10/679,807

(22) Filed: Oct. 6, 2003

(65) Prior Publication Data

US 2005/0073326 A1 Apr. 7, 2005

(51) Int. Cl.$^7$ .............................................. G01R 27/08
(52) U.S. Cl. ..................... 324/713; 324/768; 324/158.1
(58) Field of Search .................................. 374/178, 778, 374/763; 257/467; 702/104, 116, 99, 130; 324/158.1, 691, 713, 605, 768

(56) References Cited

U.S. PATENT DOCUMENTS 6,679,628 B2 * 1/2004 Breinlinger .................. 374/178

OTHER PUBLICATIONS

Maxim Integrated Products, "Remote/Local Temperature Sensor with SMBus Serial Interface", Max1617, 19–1265, Rev. 1, Mar. 1998. 20pgs.
Analog Devices, "dBCOOL™ Remote Thermal Controller and Voltage Monitor", ADM1027, Rev. A. 56pgs., 2003 no month available.

* cited by examiner

Primary Examiner—Vincent Q. Nguyen
(74) Attorney, Agent, or Firm—Buckley, Maschoff & Talwalkar LLC

(57) ABSTRACT

A system may include a first diode and a device coupled to the first diode. The device may be adapted to transmit a first current through the first diode, to determine a first voltage across the first diode, the first voltage associated with the first current, to transmit a second current through the first diode, and to determine a second voltage across the first diode, the second voltage associated with the second current. The device may be further adapted to transmit a third current through the first diode, to determine a third voltage across the first diode, the third voltage associated with the third current, and to determine a temperature of the first diode based at least in part on the first voltage, the second voltage and the third voltage.

19 Claims, 6 Drawing Sheets

METHOD AND APPARATUS TO DETERMINE INTEGRATED CIRCUIT TEMPERATURE

BACKGROUND

An integrated circuit (IC) die includes a semiconductor substrate and various electronic devices integrated therewith. The electronic devices may generate heat during operation of the IC die. This heat may adversely affect the performance of the IC die, and in some cases may damage one or more of its integrated electronic devices. Conventional systems may determine the temperature of an IC die and control operator warnings, cooling devices, processing clocks and/or other temperature-related elements based on the determined temperature.

Some conventional systems determine an IC die temperature using a diode that is integrated into the die. In particular, these systems may apply two different currents to the diode, measure a voltage drop across the diode corresponding to each of the two currents, and determine the temperature of the diode based on the two currents, the two voltage drops, and the ideal diode equation. Many of these systems do not account for the equivalent series resistance (ESR, or $R_s$) of the diode and its associated trace, thereby reducing the accuracy of the determined temperature. Some systems attempt to approximate $R_s$ and to incorporate the approximation into the determination of temperature. The approximated $R_s$ may be a fixed value and/or may be calculated based on a predetermined temperature vs. trace resistivity curve.

DETAILED DESCRIPTION

Figure 1:
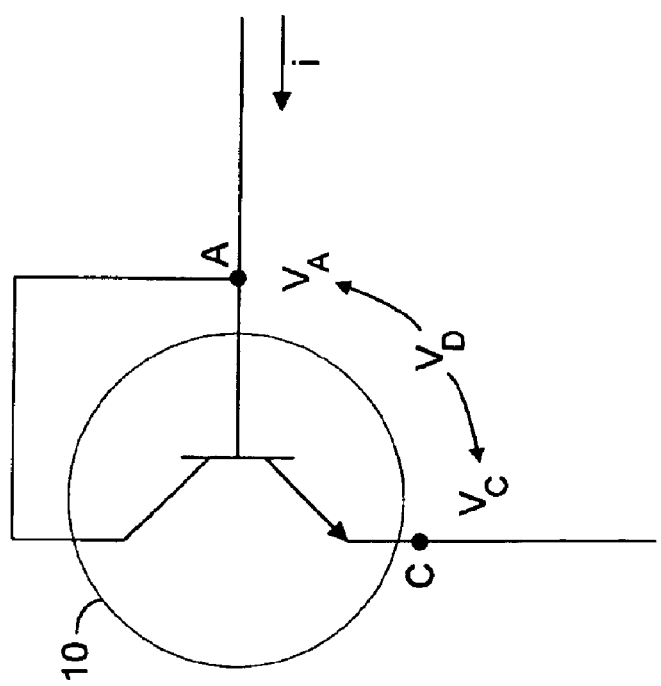
FIG. 1 is a schematic view of a diode according to some embodiments.

FIG. 1 is a schematic view of diode 10 for use in conjunction with some embodiments. Diode 10 may comprise a base-emitter junction of a substrate-connected PNP transistor. The substrate may be silicon according to some embodiments. Other suitable diodes may be used in conjunction with some embodiments.

FIG. 1 illustrates current i transmitted to diode 10. Current i generates voltage drop $v_D$ across diode 10. Voltage drop $v_D$ is equal to the difference between the voltage $v_A$ at node A of diode 10 and the voltage $v_C$ at node C. In this regard, node A is positioned at the anode of diode 10 and node C is positioned at the cathode of diode 10.

The base-emitter junction of diode 10 may be modeled by the ideal diode equation shown below:

$$i = I_s\left(e^{\frac{qV_D}{nkT}} - 1\right),$$

where $I_s$ corresponds to the saturation current of diode 10, T corresponds to the temperature of diode 10, k corresponds to Boltzmann's Constant, n corresponds to an ideality factor associated with diode 10, and q corresponds to the charge of a electron. In some embodiments, n=1 for most IC fabrication technologies and n=2 for discrete components. Particular values used for the other variables may vary depending upon desired degrees of accuracy and/or preferred units.

Figure 2:
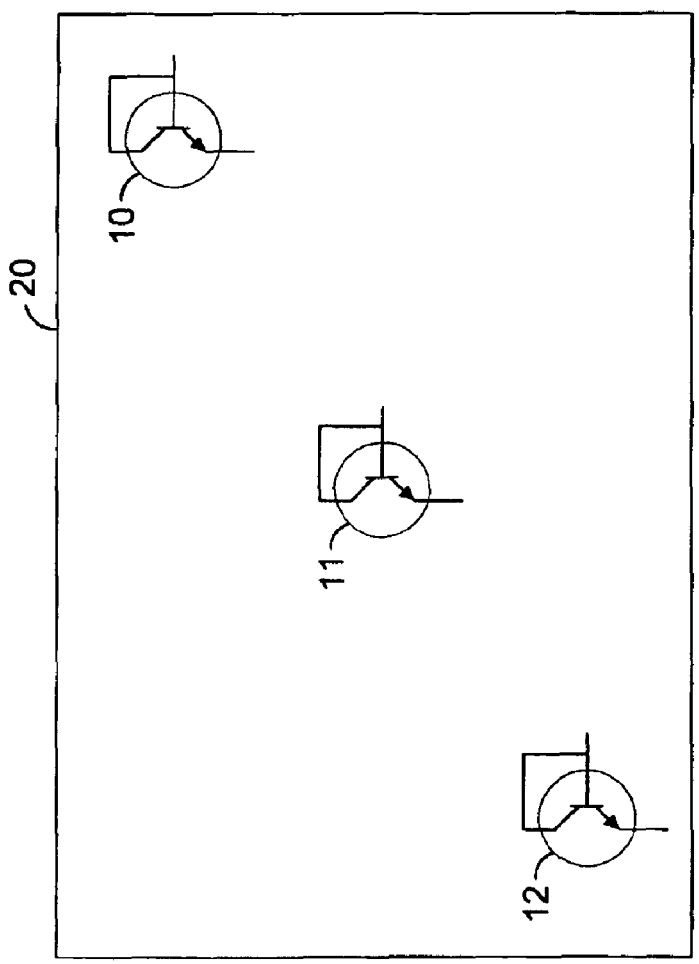
FIG. 2 is a block diagram of an IC die according to some embodiments.

FIG. 2 illustrates IC die 20 according to some embodiments. IC die 20 includes integrated electrical devices and may be fabricated using any suitable substrate material and fabrication techniques. IC die 20 may provide one or more functions. In some embodiments, IC die 20 comprises a microprocessor chip having a silicon substrate.

IC die 20 includes diode 10. IC die 20 also includes diodes 11 and 12, which may comprise identical instances of diode 10. Diodes 10, 11, and 12 may be used to determine a temperature at various locations of IC die 20, and may therefore be referred to as thermal diodes. Although shown on a surface of die 20, one or more of diodes 10, 11 and 12 may be integrated within die 20 and located under layers of dielectric, metallization, substrate, and/or other materials. IC die 20 may comprise more or fewer thermal diodes than shown in FIG. 2, and one or more of the thermal diodes may somehow differ from one or more of the other thermal diodes.

Figure 3:
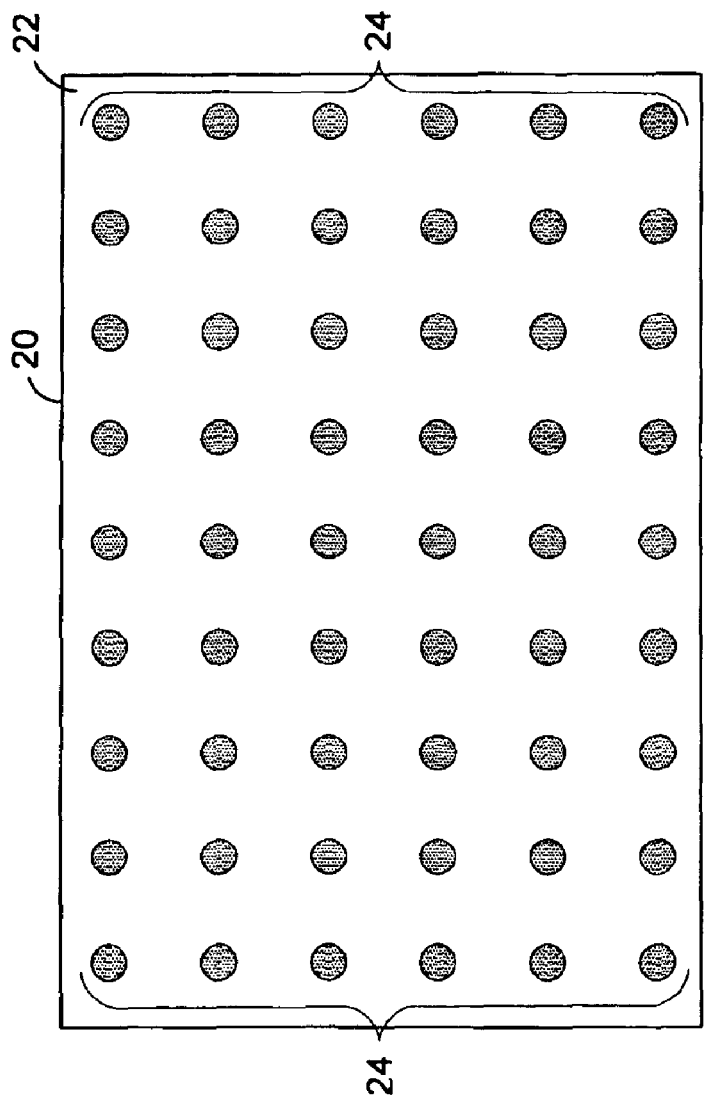
FIG. 3 is a view of an IC die according to some embodiments.

FIG. 3 shows external side 22 of IC die 20 according to some embodiments. Side 22 includes electrical contacts 24. Electrical devices that are integrated into IC die 20 may reside between a substrate of IC die 20 and electrical contacts 24. In some embodiments, such a substrate resides between the electrical devices and electrical contacts 24.

Electrical contacts 24 may be electrically coupled to the electrical devices that are integrated into IC die 20. In some embodiments, one or more of electrical contacts 24 may be coupled to node A of diode 10 and one or more of electrical contacts 24 may be electrically coupled to node C of diode 10. One or more of electrical contacts 24 may also be electrically coupled to nodes of diodes 11 and 12.

Electrical contacts 24 may comprise gold and/or nickel-plated copper contacts fabricated upon IC die 20. Electrical contacts 24 may comprise Controlled Collapse Chip Connect (C4) solder bumps. Although electrical contacts 24 are shown as having substantially circular cross sections, in other embodiments one or more of electrical contacts 24 have cross sections of different and/or varying shapes. Electrical contacts 24 may be recessed under, flush with, or extending above side 22 of IC die 20.

Figure 4:
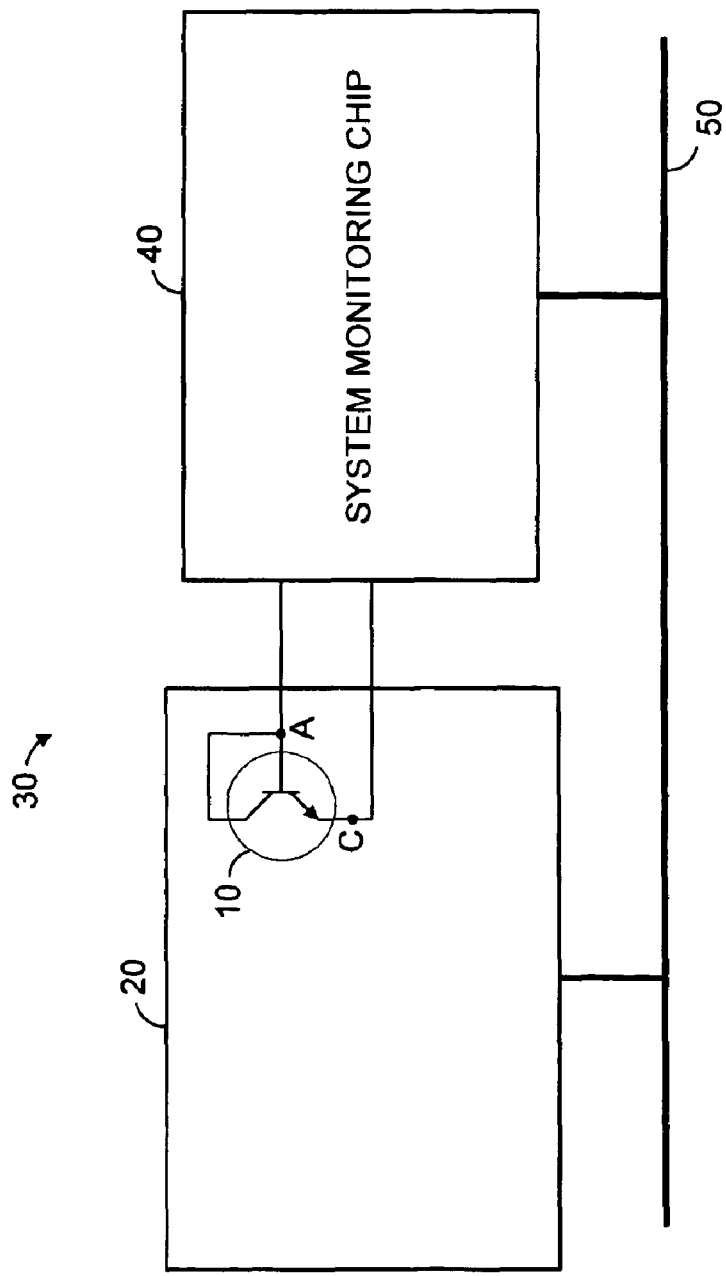
FIG. 4 is a block diagram of an apparatus according to some embodiments.

FIG. 4 illustrates apparatus 30 according to some embodiments. Apparatus 30 comprises IC die 20 and system monitoring chip 40. System monitoring chip 40 is coupled to nodes A and C of diode 10. According to some embodiments, system monitoring chip 40 may transmit a current i to diode 10 and may determine a voltage $v_D$ associated with the transmitted current. System monitoring chip 40 may be directly coupled to nodes A and C as shown in FIG. 4 or may be coupled through intermediate devices according to some embodiments. For example, a signal transmitted from monitoring chip 40 may pass through a motherboard, a socket, an IC package and electrical contacts 24 before reaching diode 10.

System monitoring chip 40 may comprise an IC that monitors remote temperatures, its own internal temperature, supply voltages associated with IC die 20, cooling fan speed, and/or other parameters. System monitoring chip 40 may also control cooling fan speed based on the monitored parameters and on specified threshold temperatures.

System monitoring chip 40 may be coupled to IC die 20 and to other unshown elements via bus 50. The unshown elements may include a memory for storing parameter values determined by chip 40, threshold values used by chip 40, or other data. Bus 50 may comprise a system monitoring bus or any other suitable bus.

In operation, system monitoring chip 40 may transmit a first current through diode 10, determine a first voltage across diode 10, the first voltage associated with the first current, transmit a second current through diode 10, and determine a second voltage across diode 10, the second voltage associated with the second current. Chip 40 may also transmit a third current through diode 10, determine a third voltage across diode 10, the third voltage associated with the third current, and determine a temperature of diode 10 based at least in part on the first voltage, the second voltage and the third voltage. Such operation will be described in detail with respect to FIG. 5.

Figure 5:
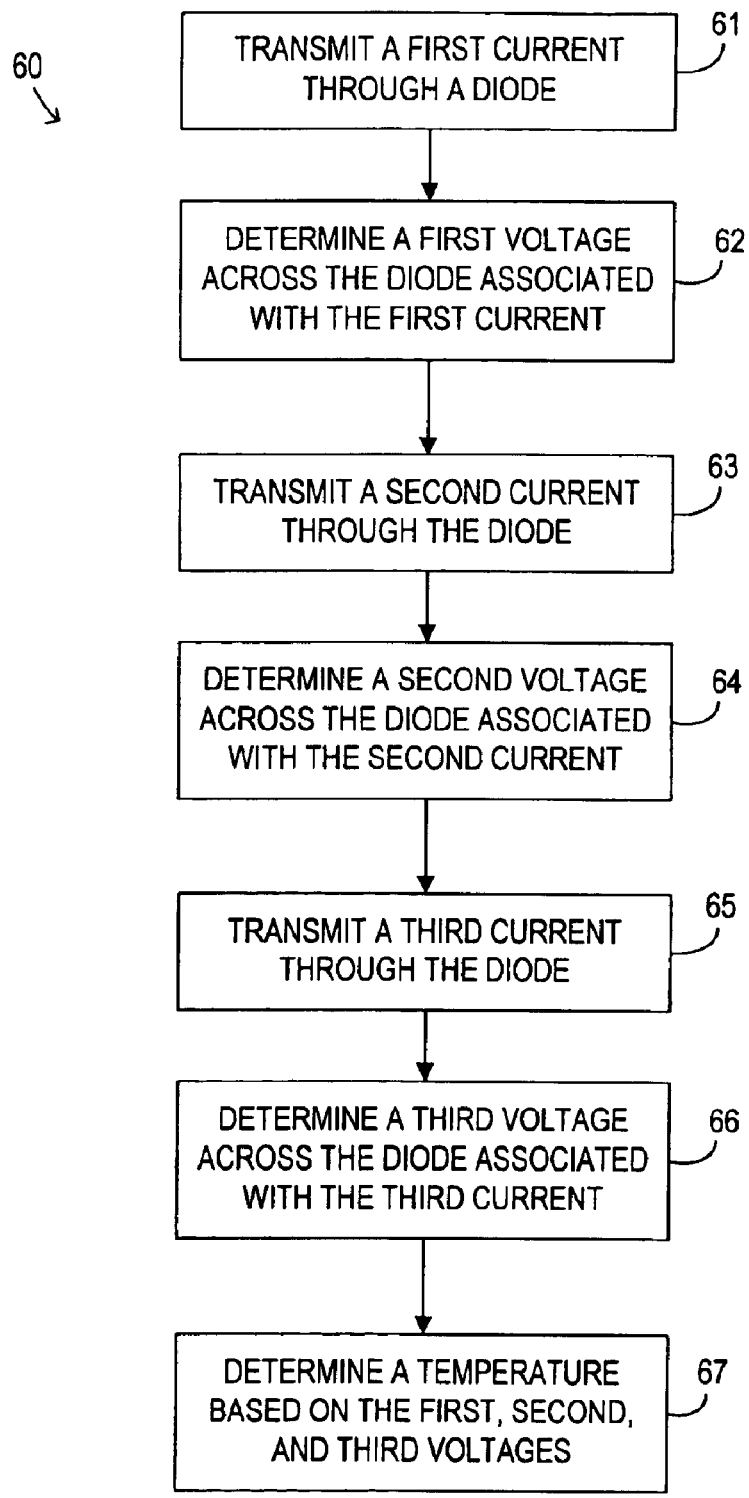
FIG. 5 is a diagram of a process to determine a temperature according to some embodiments.

FIG. 5 is a diagram of process 60 according to some embodiments. Process 60 is described below as being executed by system monitoring chip 40. Process 60 may be processed by any number of devices, including or excluding chip 40. In some embodiments, process 60 is executed by an A/D converter and a microcontroller. Process 60 may also be executed by a dedicated temperature sensor. Process 60 may be executed by one or more electrical devices integrated into die 20 according to some embodiments. Process 60 may be executed before, during or after during operation of IC die 20.

Initially, at 61, a first current $i_1$ is transmitted through diode 10. First current $i_1$ may be substantially equal to a minimum current specification of IC die 20. In some embodiments, system monitoring chip 40 transmits first current $i_1$ to node A through one or more of electrical contacts 24 that are coupled to node A of diode 10. Current $i_1$ results in a voltage $v_{A1}$ and a voltage $v_{C1}$ at respective nodes A and C of diode 10. As described above, voltage $v_{D1}=v_{A1}-v_{C1}$, and therefore is associated with current $i_1$.

Voltage $v_{D1}$ across diode 10 is determined at 62. System monitoring chip 40 may determine voltage $v_{D1}$, by determining voltage $v_{A1}$, and voltage $v_{C1}$, and by determining a difference between voltage $v_{A1}$ and voltage $v_{C1}$.

A second current $i_2$ is transmitted through diode 10 at 63. Second current $i_2$ may be substantially equal to a maximum current specification of IC die 20. System monitoring chip 40 may transmit $i_2$ to diode 10, resulting in a voltage $v_{A2}$ and a voltage $v_{C2}$ at respective nodes A and C. At 64, voltage $v_{D2}$ across diode 10 is determined as the difference between voltage $v_{A2}$ and voltage $v_{C2}$.

Next, at 65, a third current $i_3$ is transmitted through diode 10. In some embodiments, a magnitude of third current $i_3$ is substantially equal to the geometric mean of the magnitude of first current $i_1$ and the magnitude of second current $i_2$. For example, system monitoring chip 40 may include current multipliers to transmit currents $i_1$, $i_2$ and $i_3$ of 10, 30, and 90 $\mu$A using a 1x, 3x, and 9x ratio, or 6, 24, 96 $\mu$A using a 1x, 4x, and 16xratio. System monitoring chip 40 may transmit $i_3$ to diode 10, resulting in a voltage $v_{A3}$ and a voltage $v_{C3}$ at respective nodes A and C. Voltage $v_{D3}$ across diode 10 is determined at 66 as the difference between voltage $v_{A3}$ and voltage $v_{C3}$.

A temperature is determined at 67 based on voltages $v_{D1}$, $v_{D2}$, and $v_{D3}$. The temperature may correspond to a temperature of diode 10. In some embodiments, the determination of the temperature at 67 includes a determination of the ESR of a path associated with diode 10 based on voltages $v_{D1}$, $v_{D2}$, and $v_{D3}$. The following equations show the derivation of one equation for determining ESR according to some embodiments.

From the diode equation shown above:

$$\frac{i_1}{i_2} = \frac{I_s\left(e^{\frac{v_{D1}q}{knT}} - 1\right)}{I_s\left(e^{\frac{v_{D2}q}{knT}} - 1\right)} = \frac{e^{\frac{v_{D1}q}{knT}} - 1}{e^{\frac{v_{D2}q}{knT}} - 1}$$

Removing the (−1) terms for simplification results in:

$$\frac{i_1}{i_2} = \frac{e^{\frac{v_{D1}q}{knT}}}{e^{\frac{v_{D2}q}{knT}}}$$

$$\ln\left(\frac{i_1}{i_2}\right) = \ln\left(\frac{e^{\frac{v_{D1}q}{knT}}}{e^{\frac{v_{D2}q}{knT}}}\right) = \ln\left(e^{\frac{v_{D1}q}{knT}}\right) - \ln\left(e^{\frac{v_{D2}q}{knT}}\right) = \frac{v_{D1}q}{knT} - \frac{v_{D2}q}{knT}$$

Solving for T:

$$T = \left(\frac{q}{kn\ln\left(\frac{i_1}{i_2}\right)}\right)(v_{D1} - v_{D2}) \text{ or } (v_{D1} - v_{D2}) = T\frac{kn}{q}\ln\left(\frac{i_1}{i_2}\right). \quad [\text{Equation A}]$$

Therefore, $$v_{D3} - v_{D2} =$$

$$T\frac{kn}{q}\ln\left(\frac{i_3}{i_2}\right) = T\frac{kn}{q}\ln\left(\frac{\sqrt{i_1 \cdot i_2}}{i_2}\right) = T\frac{kn}{q}\ln\left(\left(\frac{i_1}{i_2}\right)^{\frac{1}{2}}\right) = 0.5T\frac{kn}{q}\ln\left(\frac{i_1}{i_2}\right)$$

and $$v_{D1} - v_{D3} =$$

$$T\frac{kn}{q}\ln\left(\frac{i_1}{i_3}\right) = T\frac{kn}{q}\ln\left(\frac{1}{\sqrt{i_1 \cdot i_2}}\right) = T\frac{kn}{q}\ln\left(\left(\frac{i_1}{i_2}\right)^{\frac{1}{2}}\right) = 0.5T\frac{kn}{q}\ln\left(\frac{i_1}{i_2}\right).$$

The values on the right side of the preceding two equalities are identical. A term may be added to the right side of each equality based on Ohm's Law to account for ESR ($R_s$) of a signal path associated with diode 10. For example:

$$v_{D3} - v_{D2} = 0.5T\frac{kn}{q}\ln\left(\frac{i_1}{i_2}\right) + (i_3 - i_2) \cdot R_s$$

$$v_{D1} - v_{D3} = 0.5T\frac{kn}{q}\ln\left(\frac{i_1}{i_2}\right) + (i_1 - i_3) \cdot R_s$$

Solving for $R_s$ in terms of voltages $v_{D1}$, $v_{D2}$, and $v_{D3}$:

$$(v_{D1} - v_{D3}) - (v_{D3} - v_{D2}) = 0.5T\frac{kn}{q}\ln\left(\frac{i_1}{i_2}\right) - 0.5T\frac{kn}{q}\ln\left(\frac{i_1}{i_2}\right) + (i_1 - i_3) \cdot R_s - (i_3 - i_2) \cdot R_s$$

$$v_{D1} - v_{D3} - v_{D3} + v_{D2} = (i_1 - i_3 - i_3 + i_2) \cdot R_s$$

$$v_{D1} + v_{D2} - 2v_{D3} = (i_1 + i_2 - 2i_3) \cdot R_s$$

$$R_s = \frac{v_{D1} + v_{D2} - 2v_{D3}}{i_1 + i_2 - 2i_3}$$

Once $R_s$ is known, the temperature may be determined using a version of Equation A:

$$T = \frac{q(v_1 - v_2 - (i_1 - i_2) \cdot R_s)}{kn \ln\left(\frac{i_1}{i_2}\right)}$$ [Equation B]

In some embodiments, the ESR of the signal path associated with diode 10 may be significant. For example, the signal path may be long or a portion of the path may present a significant resistance. It may therefore be desirable to account for the ESR in the determination of the temperature. However, it may be difficult to approximate the ESR and therefore difficult to accurately determine the temperature. The approximation may be difficult because, for example, various portions of the signal path may present different resistivities due to non-uniform heating of the signal path, and/or because the signal path itself (and its associated ESR) may be dynamic due to active switching of diode 10 to various signal paths. In these cases and others, some embodiments of process 60 might provide more accurate results than previously obtained.

In some embodiments, current $i_3$ is not equal to a geometric mean of currents $i_1$ and $i_2$. Any number of factors may result in this inequality. For example, the currents provided by one or more current sources of system monitoring chip 40 may present a small degree of error, or the inequality may result from a design decision. Equations to calculate ESR and temperature in such circumstances are derived below. The equations may be used in a case that currents $i_1$, $i_2$ and $i_3$ loosely follow a geometric progression. The equations may also be used in cases where $i_1$, $i_2$ and $i_3$ do not follow a geometric progression, and/or where current $i_3$ corresponds to a geometric mean of currents $i_1$ and $i_2$.

From Equation A, including terms to account for ESR ($R_s$):

$$(v_{D1} - v_{D3}) - (v_{D3} - v_{D2}) = T\frac{kn}{q}\left(\ln\left(\frac{i_1}{i_3}\right) - \ln\left(\frac{i_3}{i_2}\right)\right) + (i_1 - i_3) \cdot R_s - (i_3 - i_2) \cdot R_s$$

$$(v_{D1} - v_{D3}) - (v_{D3} - v_{D2}) = T\frac{kn}{q}\ln\left(\frac{i_1 i_2}{i_3^2}\right) + (i_1 + i_2 - 2i_3) \cdot R_s$$

$$R_s = \frac{v_{D1} + v_{D2} - 2v_{D3} - T\frac{kn}{q}\ln\left(\frac{i_1 i_2}{i_3^2}\right)}{i_1 + i_2 - 2i_3}$$

$R_s$ may be substituted into Equation B to derive an equation for temperature as follows:

$$T = \frac{q\left(v_{D1} - v_{D2} - (i_1 - i_2)\left(\frac{v_{D1} + v_{D2} - 2v_{D3} - T\frac{kn}{q}\ln\left(\frac{i_1 i_2}{i_3^2}\right)}{i_1 + i_2 - 2i_3}\right)\right)}{kn \ln\left(\frac{i_1}{i_2}\right)}$$

$$T = \frac{q\left(v_{D1} - v_{D2} - (i_1 - i_2)\left(\frac{v_{D1} + v_{D2} - 2v_{D3}}{i_1 + i_2 - 2i_3}\right)\right)}{kn \ln\left(\frac{i_1}{i_2}\right)} + T\frac{(i_1 - i_2)\left(\frac{\ln\left(\frac{i_1 i_2}{i_3^2}\right)}{i_1 - i_2 - 2i_3}\right)}{\ln\left(\frac{i_1}{i_2}\right)}$$

-continued $$T = \frac{\left(q\left(v_{D1} - v_{D2} - (i_1 - i_2)\left(\frac{v_{D1} + v_{D2} - 2v_{D3}}{i_1 + i_2 - 2i_3}\right)\right)\right)}{kn \ln\left(\frac{i_1}{i_2}\right)}\left(1 - \frac{(i_1 - i_2)\left(\frac{\ln\left(\frac{i_1 i_2}{i_3^2}\right)}{i_1 + i_2 - 2i_3}\right)}{\ln\left(\frac{i_1}{i_2}\right)}\right)$$

or, in simpler form:

$$a = \frac{q}{kn}, b = \frac{i_1 - i_2}{i_1 + i_2 - 2i_3}, c = \ln\left(\frac{i_1 i_2}{i_3^2}\right), d = \ln\left(\frac{i_1}{i_2}\right)$$

$$T = \left(\frac{a}{d - bc}\right)(v_{D1} - v_{D2} - b(v_{D1} + v_{D2} - 2v_{D3}))$$

In some embodiments, currents $i_1$ and $i_2$ may be any suitable currents. For example, current $i_1$ may be substantially equal to the maximum current specification of IC die 20 and current $i_2$ may be substantially equal to the minimum current specification of IC die 20. According to some embodiments, currents $i_1$, $i_2$ and $i_3$ may be transmitted to diode 10 and their associated voltages determined in any order.

Accuracy of some embodiments may be increased if the temperature of diode 10 and the ESR of the associated signal path are substantially constant during process 60. This concern may be addressed by transmitting the currents and determining the associated voltages according to a sequence that may compensate for continuously decreasing or continuously increasing temperatures. For example, the sequence $i_3$-$i_2$-$i_1$-$i_2$-$i_3$ places the $i_2$-$i_1$-$i_2$ sequence in the shortest time span. The $i_3$-$i_2$ and $i_2$-$i_3$ sequences are further separated, but the effects thereof on the determination of temperature may offset one another. This sequence requires ($v_{D3}$-$v_{D1}$) and ($v_{D1}$-$v_{D3}$) to be inferred. Other sequences may be used, some of which may be symmetrical. Possible sequences also include $i_3$-$i_2$-$i_3$-$i_1$-$i_3$ and $i_2$-$i_3$-$i_1$-$i_3$-$i_2$, in which the current swings are reduced to the smallest consecutive steps, $i_3$-$i_2$-$i_1$-$i_2$-$i_3$ In some embodiments, the measurements for one sample occur during a time interval smaller than a thermal time constant associated with the varying thermal densities occurring within IC die 20. Some embodiments minimize input capacitance to allow complete voltage settling following a current switch before voltage determination.

Some embodiments may allow for two-wire measurements. In this regard, resistances of instrumentation cables may be accounted for by the determined ESR.

Figure 6:
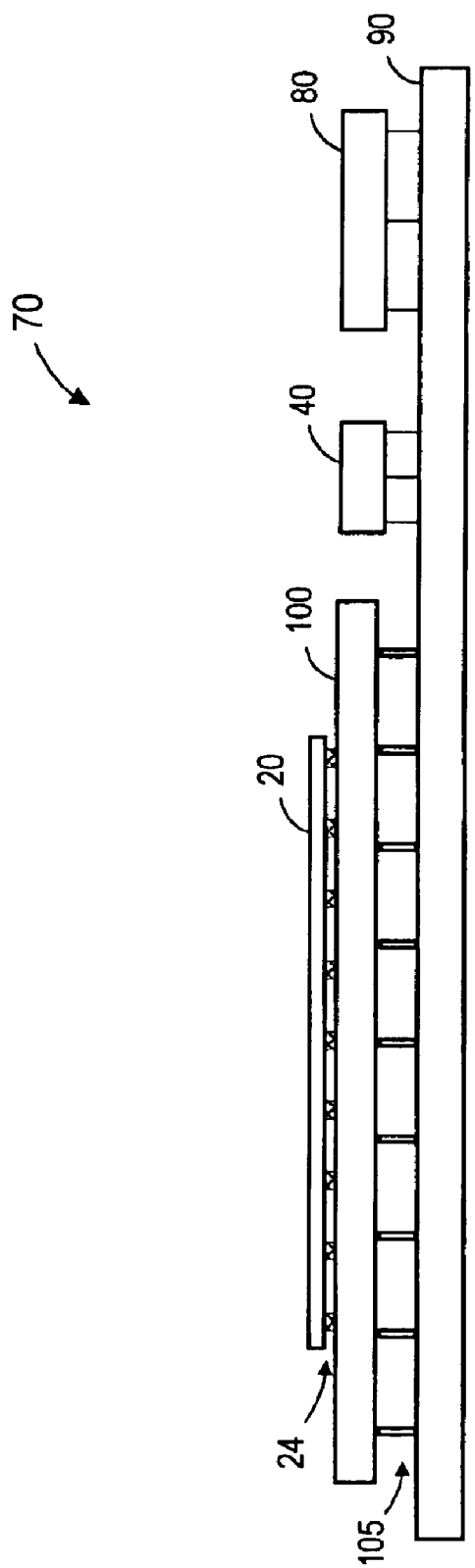
FIG. 6 is a diagram of a system according to some embodiments.

FIG. 6 is a side elevation of system 70 according to some embodiments. System 70 may comprise components of a server platform. System 70 includes IC die 20, system monitoring chip 40 as described above, memory 80 and motherboard 90. IC die 20 may comprise a microprocessor.

Substrate 100 couples electrical contacts 24 of IC die 20 to through-hole pins 105 Pins 105 may carry signals such as power and I/O signals between elements of IC die 20 and external devices. For example, pins 105 may be mounted directly on motherboard 90 or onto a socket (not shown) that is in turn mounted directly to motherboard 90. System monitoring chip 40 may also be mounted to motherboard 90 and may transmit current signals to diode 10 through motherboard 90 and appropriate ones of pins 105 and electrical contacts 24.

Motherboard 90 may also electrically couple memory 80 to IC die 20. More particularly, motherboard 90 may comprise a memory bus (not shown) that is electrically coupled to pins 105 and to memory 80. Memory 80 may comprise any type of memory for storing data, such as a Single Data Rate Random Access Memory, a Double Data Rate Random Access Memory, or a Programmable Read Only Memory.

The several embodiments described herein are solely for the purpose of illustration. The various features described herein need not all be used together, and any one or more of those features may be incorporated in a single embodiment. Some embodiments may include any currently or hereafter-known versions of the elements described herein. Therefore, persons skilled in the art will recognize from this description that other embodiments may be practiced with various modifications and alterations.

What is claimed is:

1. A method comprising:

transmitting a first current through a diode;

determining a first voltage across the diode, the first voltage associated with the first current;

transmitting a second current through the diode;

determining a second voltage across the diode, the second voltage associated with the second current;

transmitting a third current through the diode;

determining a third voltage across the diode, the third voltage associated with the third current; and determining a temperature based at least in part on the first voltage, the second voltage and the third voltage, wherein a magnitude of the third current is substantially equal to a geometric mean of a magnitude of the first current and a magnitude of the second current.

2. A method according to claim 1, wherein determining the temperature comprises:

determining the effective series resistance of a path associated with the diode based at least in part on the first voltage, the second voltage and the third voltage.

3. A method according to claim 1, wherein determining the temperature comprises determining the value of $q(v_1-v_2-(i_1-i_2) \times R_s)/(kn)\ln(i_1/i_2)$, wherein $R_s$=is substantially equal to $(v_1+v_2-2\ v_3)/(i_1+i_2-2\ i_3)$ and corresponds to the effective series resistance, and wherein $v_1$ corresponds to the first voltage, $v_2$ corresponds to the second voltage, $v_3$ corresponds to the third voltage, $i_1$ corresponds to the first current, $i_2$ corresponds to the second current, $i_3$ corresponds to the third current, k corresponds to Boltzmann's Constant, n corresponds to an ideality factor associated with the diode, and q corresponds to the charge of a electron.

4. A method comprising:

transmitting a first current through a diode;

determining a first voltage across the diode, the first voltage associated with the first current;

transmitting a second current through the diode;

determining a second voltage across the diode, the second voltage associated with the second current;

transmitting a third current through the diode;

determining a third voltage across the diode, the third voltage associated with the third current; and determining a temperature based at least in part on $(a/(d-bc))(v_1-v_2-b(v_1+v_2-2\ v_3))$, wherein $a=q/kn$, $b=(i_1-i_2)/(i_1+i_2-2\ i_3)$, $c=\ln[(i_1i_2)/i_3^2]$, and $d=\ln(i_1/i_2)$, and wherein $v_1$ corresponds to the first voltage, $v_2$ corresponds to the second voltage, $v_3$ corresponds to the third voltage, $i_1$ corresponds to the first current, $i_2$ corresponds to the second current, $i_3$ corresponds to the third current, k corresponds to Boltzmann's Constant, n corresponds to an ideality factor associated with the diode, and q corresponds to the charge of a electron.

5. A method according to claim 4, wherein a magnitude of the first current, a magnitude of the third current, and a magnitude of the second current substantially conform to a geometric progression.

6. An apparatus comprising:

a first diode;

a device coupled to the first diode to transmit a first current through the first diode, to determine a first voltage across the first diode, the first voltage associated with the first current, to transmit a second current through the first diode, to determine a second voltage across the first diode, the second voltage associated with the second current, to transmit a third current through the first diode, to determine a third voltage across the first diode, the third voltage associated with the third current, and to determine a temperature of the first diode based at least in part on the first voltage, the second voltage and the third voltage, wherein a magnitude of the third current is substantially equal to a geometric mean of a magnitude of the first current and a magnitude of the second current.

7. An apparatus according to claim 6, the device to determine the temperature by determining the effective series resistance of a path associated with the first diode based at least in part on the first voltage, the second voltage and the third voltage.

8. An apparatus according to claim 6, the device to determine the temperature by determining the value of $q(v_1-v_2-(i_1-i_2) \times R_s)/(kn)\ln(i_1/i_2)$, wherein $R_s=(v_1+v_2-2\ v_3)/(i_1+i_2-2\ i_3)$ and corresponds to the effective series resistance, and wherein $v_1$ corresponds to the first voltage, $v_2$ corresponds to the second voltage, $v_3$ corresponds to the third voltage, $i_1$ corresponds to the first current, $i_2$ corresponds to the second current, $i_3$ corresponds to the third current, k corresponds to Boltzmann's Constant, n corresponds to an ideality factor associated with the diode, and q corresponds to the charge of a electron.

9. An apparatus according to claim 6, further comprising:

a second diode, wherein the device is coupled to the second diode to transmit a fourth current through the second diode, to determine a fourth voltage across the second diode, the fourth voltage associated with the fourth current, to transmit a fifth current through the second diode, to determine a fifth voltage across the second diode, the fifth voltage associated with the fifth current, to transmit a sixth current through the second diode, to determine a sixth voltage across the second diode, the sixth voltage associated with the sixth current, and to determine a temperature of the second diode based at least in part on the third voltage, the fourth voltage and the fifth voltage.

10. An apparatus according to claim 9, wherein the first diode and the second diode are integrated into a same substrate.

11. An apparatus according to claim 6, wherein the device comprises an analog-to-digital converter and a microcontroller.

12. An apparatus according to claim 11, wherein the first diode and the device are integrated into a same substrate.

13. An apparatus comprising:

a first diode;

a device coupled to the first diode to transmit a first current through the first diode, to determine a first voltage across the first diode, the first voltage associated with the first current, to transmit a second current through the first diode, to determine a second voltage across the first diode, the second voltage associated with the second current, to transmit a third current through the first diode, to determine a third voltage across the first diode, the third voltage associated with the third current, and to determine a temperature of the first diode based at least in part on $(a/(d-bc))(v_1-v_2-b(v_1+v_2-2\ v_3))$, wherein $a=q/kn$, $b=(i_1-i_2)/(i_1+i_2-2\ i_3)$, $c=\ln[(i_1 i_2)/i_3^2]$, and $d=\ln(i_1/i_2)$, and wherein $v_1$ corresponds to the first voltage, $v_2$ corresponds to the second voltage, $v_3$ corresponds to the third voltage, $i_1$ corresponds to the first current, $i_2$ corresponds to the second current, $i_3$ corresponds to the third current, k corresponds to Boltzmann's Constant, n corresponds to an ideality factor associated with the diode, and q corresponds to the charge of a electron.

14. An apparatus according to claim 13, wherein a magnitude of the first current, a magnitude of the third current, and a magnitude of the second current substantially conform to a geometric progression.

15. A system comprising:

an integrated circuit comprising a first diode;

a device coupled to the first diode to transmit a first current through the first diode, to determine a first voltage across the first diode, the first voltage associated with the first current, to transmit a second current through the first diode, to determine a second voltage across the first diode, the second voltage associated with the second current, to transmit a third current through the first diode, to determine a third voltage across the first diode, the third voltage associated with the third current, and to determine a temperature of the first diode based at least in part on the first voltage, the second voltage and the third voltage, a magnitude of the third current being substantially equal to a geometric mean of a magnitude of the first current and a magnitude of the second current; and a double data rate memory electrically coupled to the integrated circuit.

16. A system according to claim 15, the device to determine the temperature by determining the effective series resistance of a path associated with the first diode based at least in part on the first voltage, the second voltage and the third voltage.

17. A system according to claim 15 the device to determine the temperature by determining the value of $q(v_1-V_2-(i_1-i_2) \times R_s)/(kn)\ln(i_1/i_2)$, wherein $R_s=(v_1+v_2-2\ v_3)/(i_1+i_2-2\ i_3)$ and corresponds to the effective series resistance, and wherein $v_1$ corresponds to the first voltage, $v_2$ corresponds to the second voltage, $v_3$ corresponds to the third voltage, $i_1$ corresponds to the first current, $i_2$ corresponds to the second current, $i_3$ corresponds to the third current, k corresponds to Boltzmann's Constant, n corresponds to an ideality factor associated with the diode, and q corresponds to the charge of a electron.

18. A system according to claim 15, the device to determine the temperature by determining the value of $(a/(d-bc))(v_1-v_2-b(v_1+v_2-2\ v_3))$, wherein $a=q/kn$, $b=(i_1-i_2)/(i_1+i_2-2\ i_3)$, $c=\ln[(i_1 i_2)/i_3^2]$, and $d=\ln(i_1/i_2)$, and wherein $v_1$ corresponds to the first voltage, $v_2$ corresponds to the second voltage, $v_3$ corresponds to the third voltage, $i_1$ corresponds to the first current, $i_2$ corresponds to the second current, $i_3$ corresponds to the third current, k corresponds to Boltzmann's Constant, n corresponds to an ideality factor associated with the diode, and q corresponds to the charge of a electron.

19. A system according to claim 15, wherein the integrated circuit comprises a microprocessor.

* * * * *